C. W. PRIDE.
DEMOUNTABLE RIM FOR WHEELS OF VEHICLES.
APPLICATION FILED JUNE 6, 1914.

1,300,223.

Patented Apr. 8, 1919.

Witnesses.
John Paul Black
George Ham

Inventor
Christopher W. Pride
by Arthur H. Stanley
Attorney

UNITED STATES PATENT OFFICE.

CHRISTOPHER W. PRIDE, OF CANTON, CARDIFF, ENGLAND, ASSIGNOR TO HIMSELF AND JOHN JENKINS DAVID, OF CARDIFF, ENGLAND.

DEMOUNTABLE RIM FOR WHEELS OF VEHICLES.

1,300,223. Specification of Letters Patent. Patented Apr. 8, 1919.

Application filed June 6, 1914. Serial No. 843,579.

*To all whom it may concern:*

Be it known that I, CHRISTOPHER WILLIAM PRIDE, a subject of the King of Great Britain and Ireland, residing at 2 Heath street, Canton, Cardiff, Glamorganshire, England, have invented new and useful Improvements in Demountable Rims for Wheels of Vehicles, of which the following is a specification.

This invention relates to demountable rims for the wheels of motor cars and like vehicles.

In order to avoid the inconveniences and loss of time entailed in repairing punctures on the road, it is now a common practice in motor-car engineering for a car to be fitted with detachable wheels and for a spare wheel fitted with a sound tire to be carried on the car, so that in the event of a puncture occurring, the wheel carrying the punctured tire can be altogether removed and the fresh wheel with the sound tire substituted. The whole wheel from the hub shell outward is removed, and the spare wheel carried is of course similar in construction to the wheel removed, that is, it comprises a hub shell, spokes and a tire-carrying rim.

Now I have found in practice that these wheels are often very difficult to remove and usually, special devices are required for doing so. The time taken in removing them may sometimes be as great as would be necessary for effecting the repair of the puncture or other injury. Moreover, a fully equipped motor car wheel is somewhat weighty, especially with the heavier class of vehicles, and if a couple or more spare wheels are carried on the car, may mean an appreciable addition to the load to be considered.

Now it is the object of my invention to obviate these disadvantages by providing a demountable rim which engages with a fixed internal rim rigidly attached to the spokes and hub of the wheel, the engagement being effected by means of projections on the one rim, which enter recesses provided in or upon the other rim, a special lock preventing relative movement of the two rims when once the engagement has been effected. It is sufficient to carry on the car the demountable rim fitted with a sound tire, and this of course is relatively very light compared with the weight of the whole wheel. When a puncture or other injury to a tire occurs, it is only necessary to release the lock, rotate the demountable rim slightly in the right direction so as to disengage the projections from the recesses and then withdraw it from the internal rim. In replacing it with the spare rim carrying the sound tire, the above operations are simply carried out in the reverse order.

I will now describe my invention more particularly with reference to the accompanying drawings, which show an embodiment of my invention by way of example only.

In the drawings:—

Figure 1:
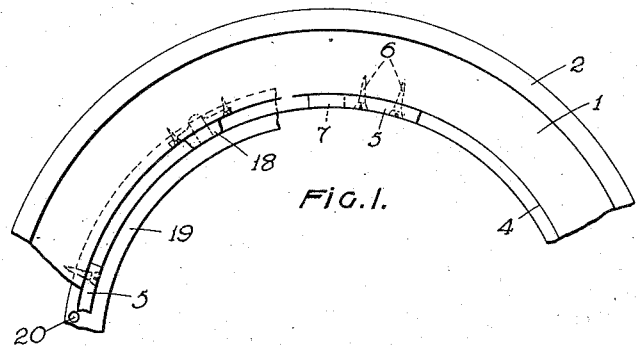
Figure 1 is a side elevation and Fig. 2 is an end view partly in section corresponding thereto.
Figure 2:
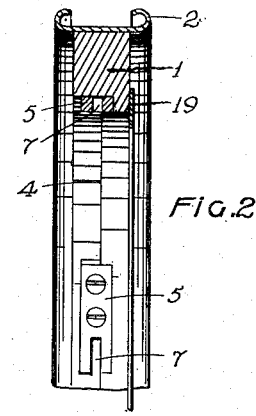
Figure 5:
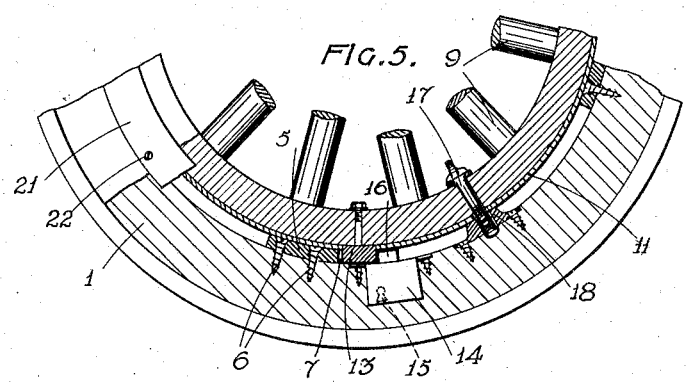
Fig. 5 is a part sectional elevation and Fig. 6 a cross section, showing parts of the demountable rim and the internal rim when in engagement with each other.
Figure 6:
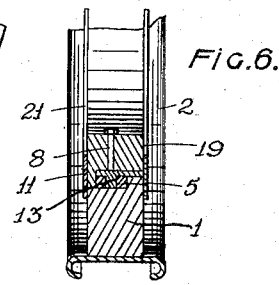
Figure 3:
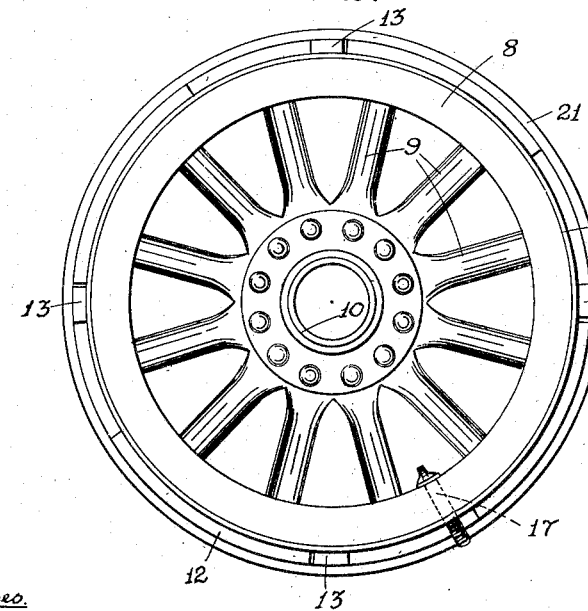
Figs. 3 and 4 are similar views of the fixed internal rim attached to the hub and spokes of the wheel.
Figure 4:
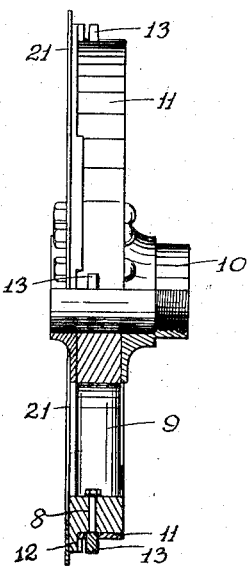

Referring to Figs. 1 to 4 of the drawings, the demountable rim consists of a felly 1, preferably of wood or similar material to which is secured the iron rim 2 carrying the tire in the usual manner. (Figs. 1 and 2). The internal surface of the felly 1 is cut away on one side so as to form a circular ledge 4, the object of which will be pointed out later, and the cut away portion is provided at intervals round its circumference with upstanding plates 5. These are preferably four in number, each being secured to the felly 1 by screws 6 and furnished with a longitudinal slot 7 forming a recess. The surface of the plates is flush with the circular ledge 4.

The fixed internal rim (Figs. 3 and 4) consists of a wooden felly 8 attached to the spokes 9 and the hub 10 of the wheel, the rim being provided with an iron rim 11 of equal diameter to the circular ledge 4 of the felly 1, and a raised circular ledge 12 equal in diameter to the cut-away portion of the felly 1 (Figs. 1 and 2). The iron rim 11 is provided with projections 13 equal in breadth and depth to the slots 7 of the upstanding plates 5. The projections 13 are equally numbered to the slots 7 and are spaced apart to correspond in position with the said slots. The projections 13 may be made either integral with the rim 11 or may be inserted into the latter and secured by nuts on the inner side of the felly 8.

At the open end of one of the slots 7 and flush with the cut away portion of the felly 1, is a lock 14 which is provided in the felly 1 and is of any usual construction. The lock has a key-hole 15 on one face of the demountable rim and the latch 16 of the lock normally lies flush with the cut-away portion of the felly 1 when not in a locking position.

As the rim 11 is of equal diameter to the circular ledge 4, and the circular ledge 12 to the cut-away portion of the felly 1, it will be seen that the rim can be put in position on the internal rim with these parts in engagement, care being taken that the projections 13 do not coincide in position with the slots 7, and that the latch 16 of the lock 15 lies flush with the cut away portion of the felly 1, that is, that the lock is disengaged. On rotating the demountable external rim, it will be seen that the projections 13 will enter the slots 7 and move forward until the closed ends of the slots are reached, and further movement is impossible. If then the key is turned in the lock 14, the latch 16 rises behind one of the projections 13 and so locks the two rims together. For greater safety, one or more security bolts 17 may be provided, said bolts passing through the felly 8 and rim 11 and entering the screwed socket 18 in the external felly 1, and so securing the internal and external rims together.

For the purpose of covering the joints between the two rims, the felly 1 is provided with a flange ring 19 secured to it by screws 20 and extending partly over the rim 11 when the two parts are in engagement. The felly 8 is also provided with a flange ring 21 secured to it by screws 22 and extending partly over the surface of the felly 1. These rings 19 and 21 assist in preventing wet from entering between the internal and external rims and so help to avoid the two parts from rusting together.

In this wheel, the valve tube does not extend beyond the internal surface of the demountable rim.

When a puncture occurs, it is only necessary to disengage the lock, move the external demountable rim forward until the projections 13 are clear of the slots 7, and then withdraw the external rim. The fresh rim and sound tire are then put on in the manner described above. When moving forward the internal rim tends to overrun the external rim, owing to the friction of the latter on the road, and thus tends to force the projections 13 home into their slots 7. On reverse driving, the strain is transferred to the latch 16 and security bolts 17.

Many modifications may of course be made without departing from the spirit of the invention, and I do not wish to be limited to the exact construction shown.

I claim:

1. A wheel with a detachable rim for motor cars and like vehicles, comprising an internal rim member carried by the spokes of the wheel, and an outer rim member adapted to carry a tire, there being a circular ledge upon the edge of the circumference of said internal rim member, also projections upon said circumference, and a circular ledge upon the opposite edge of the circumference of said outer rim member, the internal diameters of said outer rim member and ledge of same being equal to the diameters respectively, of said circular ledge on the internal rim member and said member, together with the slotted plates secured upon said outer rim member flush as regards radial distance from the center with the upstanding circular ledge upon same, said plates being let into recesses in the side of said ledge and being so positioned as to enable the projections aforesaid to slide circumferentially into the slots of said plates, and a key-operated lock in the outer rim member flush with the inner circumference of same, the bolt of which is adapted to be projected behind one of the projections aforesaid and prevent the withdrawal of the latter by circumferential force after such projection has been slid inside a slotted plate as described.

2. A wheel with a detachable rim for motor cars and like vehicles, comprising an internal rim member carried by the spokes of the wheel, and an outer rim member adapted to carry a tire, there being a circular ledge upon the edge of the circumference of said internal rim member, also projections upon said circumference, and a circular ledge upon the opposite edge of the circumference of said outer rim member, the internal diameters of said outer rim member and ledge of same being equal to the diameters respectively of said circular ledge on the internal rim member and said member, together with slotted plates secured upon said outer rim member flush as regards radial distance from the center with the upstanding circular ledge upon same, said plates being let into recesses in the side of said ledge and being so positioned as to enable the projections aforesaid to slide circumferentially into the slots of said plates, and a key-operated lock in the outer rim member flush with the inner circumference of same, the bolt of which is adapted to be projected behind one of the projections aforesaid and prevent the withdrawal of the latter by circumferential force after such projection has been slid inside a slotted plate as described, and rings on said internal and outer rim members respectively adapted to cover the joint formed when the outer rim member is brought into engagement with the internal rim member, substantially as described.

CHRISTOPHER W. PRIDE.

Witnesses:
 GEORGE HAM,
 JOHN P. BLACK.